United States Patent [19]
Gehring

[11] 3,856,065
[45] Dec. 24, 1974

[54] LOCKING SCREW

[76] Inventor: James H. Gehring, 4080 N. Sagamore Rd., Fairview Park, Ohio 44126

[22] Filed: Jan. 2, 1973

[21] Appl. No.: 320,636

Related U.S. Application Data

[63] Continuation of Ser. No. 162,086, July 13, 1971, abandoned.

[52] U.S. Cl. .................................................. 151/22
[51] Int. Cl. ............................................ F16b 39/30
[58] Field of Search .......................... 151/22, 14 R

[56] References Cited
UNITED STATES PATENTS
1,933,332  10/1933  May ..................................... 151/22
2,263,137  11/1941  Oestereicher ......................... 85/46
2,301,181  11/1942  Ilsemann ............................... 151/22
3,339,389   9/1967  Mosow ................................... 151/22

FOREIGN PATENTS OR APPLICATIONS
757,763   9/1956  Great Britain ...................... 151/22

*Primary Examiner*—Edward C. Allen
*Attorney, Agent, or Firm*—John S. Hale

[57] ABSTRACT

A lock screw comprising a threaded shank and integral screwhead provided with a torque-receiving means. A plurality of protuberances are formed integrally on the threaded shank. When the screw is installed in a parent material, the protuberances press against the parent material, locking the screw in place.

5 Claims, 5 Drawing Figures

PATENTED DEC 17 1974  3,856,065

LOCKING SCREW

This is a continuation, of application Ser. No. 162,086, filed July 13, 1971, and now abandoned.

This invention generally relates to an improvement in locking screws designed for use in a tapped hole and more specifically to a screw that has an improved locking feature comprising protuberances on its surface. The screw can be designed to enter a threaded (tapped), cored or drilled hole.

BACKGROUND OF THE INVENTION

There are several locking screws which are presently available. Some presently used locking screws are combined either with lockwashers or with plastic patches or inserts on the screw's threads.

In the lockwasher-type locking screw, the lockwasher locks the screw in place after the screw is installed and the lockwasher, which is usually made of a spring steel material, is squeezed between the head of the screw and the attaching piece. The lockwashers grip soft metal or other relatively soft materials, but seldom hold firm to the hard surface under the head of the screw.

The plastic patch or plastic-insert-type locking screw locks the screw in place by pressing the threads opposite the plastic patch or plastic insert against the mating threads. The plastic patch or insert locks the screw to nuts the same as into threaded holes by pressing the threads opposite the patch or insert against the mating nut's threads.

The present invention serves as a replacement for lock nuts similar to the plastic patch or plastic insert on the male threads by providing a screw which will withstand vibrations for extended periods after being locked without loosening. This eliminates the need for lock nuts with the added feature of being economical to produce.

The screw surface has protuberances designed to restrict movement of the screw as the parent material is pressed against the protuberances so that the screw's backout torque will increase. While the protuberances can be of various designs, the preferred embodiment discloses partially filled protuberances with jagged peaks.

The protuberances are relatively close together and extend over a large enough portion of the screw so as to provide sufficient locking action without causing erratic installation torques.

Other features and advantages of the invention will be apparent from the following description of the embodiments of the invention as shown in the accompanying drawings.

DETAILED DESCRIPTION OF THE DRAWINGS

Figure 1:
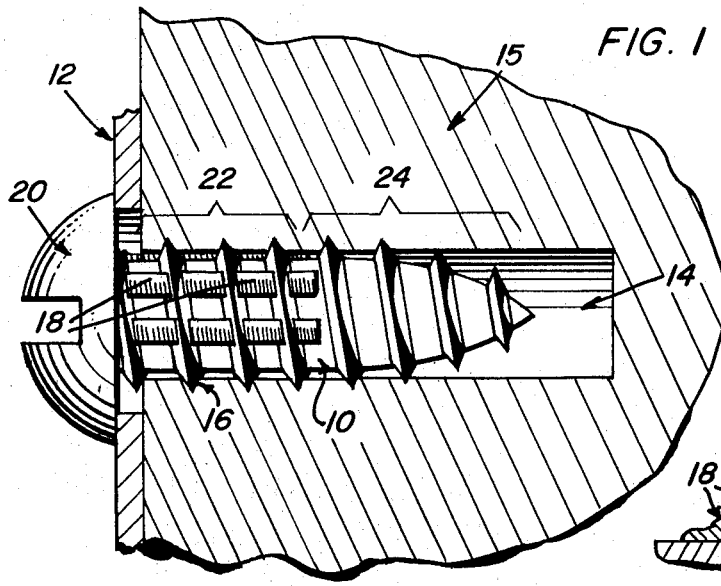
FIG. 1 is a side elevation view of the screw in locking association with a workpiece.

FIG. 1 shows the screw 10 going through an attaching member 12 and engaging workpiece 15 in the bore of the hole 14. The screw 10 comprises a threaded shank 16 having integral protuberances 18 and an integral screwhead 20 with a torque-receiving means.

While the screwhead 20 is shown with a standard round configuration, other screwhead configurations, such as flat, oval, truss, pan, hexagon, indented hexagon, indented hexagon washer and phillips modifications of the same, can be used.

Figure 3:
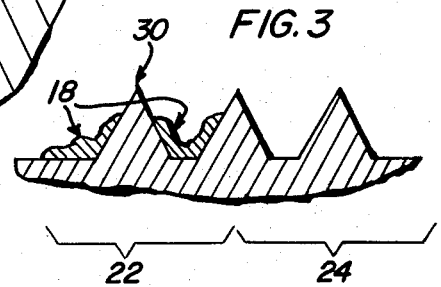
FIG. 3 is an enlarged fragmentary longitudinal sectional view of the thread convolutions and protuberances of the screw.
Figure 2:
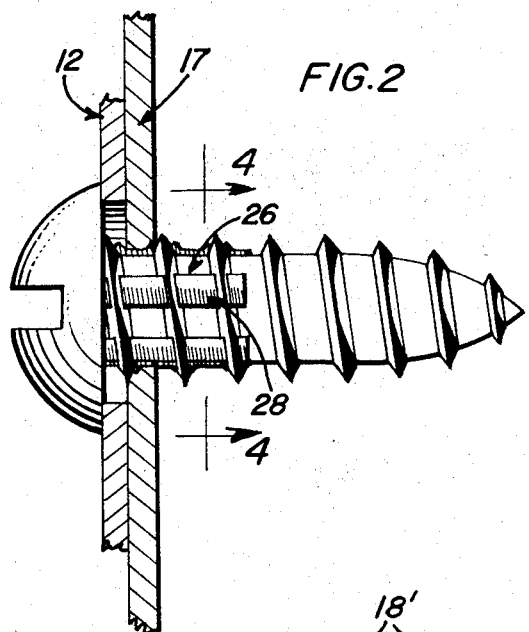
FIG. 2 is a side elevation view of the screw in locking association with a sheet metal workpiece.

The threaded shank 16 basically comprises a lower portion 24 which is designed to enter the workpiece 15 and an upper or locking portion 22 as shown in FIGS. 1 and 3. The protuberances 18 on the thread surface of the screw, having entered the workpiece 15, engage it so that workpiece material is pressed into interference with the protuberances, thereby increasing the backout torque of the screw. As shown in FIG. 2, said figure disclosing the locking screw being used with sheetmetal, some of the sheetmetal material 17 is functionally engaged into the locking protuberances so as to lock the screw in place. In FIG. 2, 26 is the steep slope and 28 is the gradual slope of the locking protuberance. In the preferred embodiment, the jagged, unfilled edges of the protuberances 18 provide the unique locking action.

The tip of each protuberance 18 preferably extends up approximately half of a thread surface to a point preferably midway between the minor diameter and the thread crest 30 of the thread-forming screws with the protuberance body adjacent the shank body. The protuberances on thread-forming screws are preberably only slightly filled approximately 0.006 inches high.

Thus, the protuberances 18 form a series of U-shaped jagged edged ribs which extend beyond the minor diameter or shank body diameter, but do not extend beyond the adjacent thread crests. In this way, the ease in which the screw can be turned in the workpiece is facilitated so that protuberances 18 exert a camming action against the workpiece to cause the workpiece to engage and lock the thread crests. The 0.006-inch fill will permit the form of the protuberances to be visible when looking at the screw.

Figure 5:
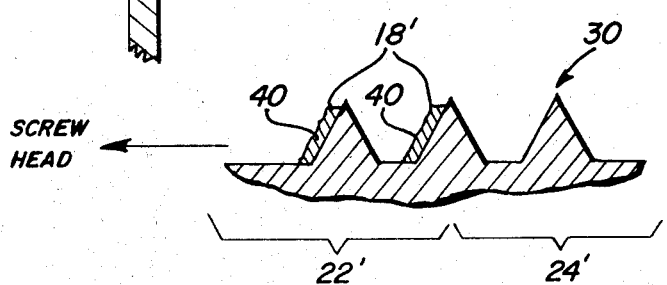
FIG. 5 is also an enlarged fragmentary longitudinal sectional view of the thread convolutions and protuberances of the screw.

FIG. 5 shows the protuberances located on the upper thread surface 40 of the thread form. The upper thread surface 40 is the point at which the locking effect is greatest. When the screw is tightened and seated in place this upper thread surface is being pulled against the parent material whether it be sheet metal, plastic or a cast material.

Machine screws should have a greater degree of filling of the protuberances. The amount of fill necessary will depend on the locking action required.

Figure 4:
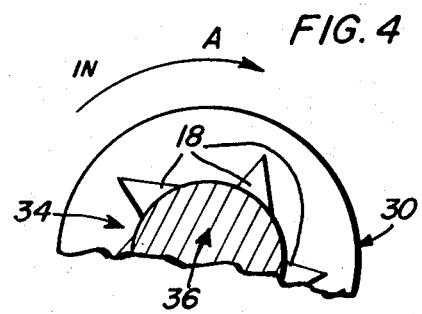
FIG. 4 is an enlarged partial sectional view taken along line 4'—4' of FIG. 2.

The locking protuberances 18 preferably are constructed with a surface having a more gradual slope on entry, the direction of entry being shown by arrow A in FIG. 4, than in the direction of removal.

It is beneficial to have a back-tapered protuberance, as this permits the screw to enter easier and lock tighter than would a screw having a symmetrical protuberance. However, a symmetrical protuberance can be used if such is desired. As shown in FIG. 4, 30 is the crest of the thread, 34 is the minor diameter of the thread or root and 36 is the solid center of the screw.

After the screw has been finally installed, the protuberances press the workpiece material into functional engagement with the screw threads.

When the screw is installed into tapped holes or into nuts, sharp edges should be avoided as much as possible on the leading edge of the protuberances so as not to damage the threads mating with the protuberances.

As the screw is installed, the protuberances on the threads have an interference fit with the mating threads. When the protuberances meet with the mating threads, they are usually smoothed out and most of the sharp edge is removed. Some of the material may be removed from the parent threads but not enough to cause a weak joint.

The protuberances will not always fill out completely. This is especially true with spaced threads. The degree of fill should be only enough to provide a functional locking action, allowing the locking portion 24 to be firmly secured against loosening by vibrations or other means.

While the preferred embodiments of the invention have been disclosed, it is understood that the invention is not limited to such embodiments since it may be otherwise embodied in the scope of the appended claims.

What is claimed is:

1. A self-locking screw comprising a threaded shank having an integral screw head with a torque receiving means, said threaded shank comprising an entering section and a locking section, said locking section comprising a plurality of back-tapered protuberances connected to said threaded shank between adjacent thread surfaces, each said protuberance forming an angled surface having a gradually inclined face facing the direction of the screw turn, and a steep sloped face, said protuberances forming locking means running longitudinally to said threaded shank and angularly to said shank threads, each protuberance extending beyond the shank body diameter a distance less than the crest of said threads and defining a substantially U-shaped configuration having a sharp jagged profile with each end portion of each protuberance engaging an adjacent thread surface and extending up the adjacent thread surface a greater distance from the minor diameter of the screw than the center section of the protuberance.

2. A self-locking screw as claimed in claim 1 wherein said protuberances extend from said shank body not more than 0.006 inches.

3. A self-locking screw as claimed in claim 1 wherein said protuberances have an interference fit with the mating threads of said shank so that when the protuberances meet with the mating threads the protuberances are smoothed out to remove a substantial portion of the sharp profiles.

4. A self-locking screw as claimed in claim 1, wherein said shank and plurality of integral protuberances have a ratchet-shaped cross section.

5. A self-locking screw as claimed in claim 1 wherein said protuberances run parallel to the axis of the screw.

* * * * *